(12) United States Patent
Kamakura

(10) Patent No.: US 10,642,051 B2
(45) Date of Patent: May 5, 2020

(54) VIRTUAL-IMAGE DISPLAY DEVICE AND NOSE PAD FOR VIRTUAL-IMAGE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/257,626

(22) Filed: Jan. 25, 2019

(65) Prior Publication Data

US 2019/0235254 A1    Aug. 1, 2019

(30) Foreign Application Priority Data

Jan. 26, 2018  (JP) .................................. 2018-011318

(51) Int. Cl.
  *G02B 27/01*   (2006.01)

(52) U.S. Cl.
  CPC ..... *G02B 27/0176* (2013.01); *G02B 27/0172* (2013.01); *G02B 2027/0158* (2013.01); *G02B 2027/0178* (2013.01); *G02B 2027/0181* (2013.01)

(58) Field of Classification Search
None
See application file for complete search history.

(56) References Cited

U.S. PATENT DOCUMENTS

| 5,539,422 A | * | 7/1996 | Heacock | G02B 27/0172 345/8 |
| 8,123,352 B2 | * | 2/2012 | Matsumoto | G02B 27/0176 351/114 |
| 8,226,227 B2 | * | 7/2012 | Ohno | G02B 27/0176 349/13 |
| 2009/0073082 A1 | * | 3/2009 | Yoshikawa | G02B 27/0172 345/8 |
| 2012/0147317 A1 | * | 6/2012 | Loeb, Jr. | G02C 7/066 351/55 |
| 2012/0200934 A1 | * | 8/2012 | Fujishiro | G02B 30/34 359/630 |
| 2014/0368787 A1 | * | 12/2014 | Gottardi | G02C 5/143 351/158 |

(Continued)

FOREIGN PATENT DOCUMENTS

| JP | 2010-044193 A | 2/2010 |
| JP | 2017-147522 A | 8/2017 |

(Continued)

*Primary Examiner* — Nicholas J Lee
(74) *Attorney, Agent, or Firm* — Oliff PLC

(57) ABSTRACT

A rotation adjustment mechanism SA is configured to allow a pad L, R, which is brought into contact with the nose of a viewer, to axially rotate to change its posture while restricting the axial rotation at a predetermined position. This configuration enables the nose pad to be positioned in place, in other words, enables the visual recognition position f in the virtual-image display device to be adjusted in an easy and rapid manner by a method of rotating the pad L, R and retaining it at an appropriate position, thereby meeting various requirements made by unspecified individuals such as making adjustment according to the shape of their own nose.

12 Claims, 14 Drawing Sheets

(56) References Cited

U.S. PATENT DOCUMENTS

2016/0103325 A1\*   4/2016   Mirza ................ G02B 27/0179
                                                    348/335
2016/0266412 A1\*   9/2016   Yoshida ............. G02B 27/0172
2018/0052327 A1    2/2018   Kamakura
2018/0059434 A1\*   3/2018   Heisey .................. G06F 1/163

FOREIGN PATENT DOCUMENTS

JP      2018-033120 A      3/2018
WO      2016/052168 A1     4/2016

\* cited by examiner

VIRTUAL-IMAGE DISPLAY DEVICE AND NOSE PAD FOR VIRTUAL-IMAGE DISPLAY DEVICE

BACKGROUND

1. Technical Field

The invention relates to a virtual-image display device and a nose pad for the virtual-image display device.

2. Related Art

Typically, head mounted displays that are worn on the head portion of a viewer are well known as a virtual-image display device. Note that such a head mounted display is also referred to as a head-mounted image display device or simply referred to as an HMD.

As for such a virtual-image display device, there is a demand for the device having a configuration in which the position of the nose pad is adjustable according to the shape of a nose, in other words, the height of the HMD and the like. In particular, in applications where one HMD may be used by unspecified individuals, the nose pad needs to be adjusted for each viewer, and hence, it is important to easily and rapidly make adjustment.

For example, a head-mounted image display device having an adjustable nose pad is known as described in JP-A-2017-147522. In addition, although not related to the HMD, the frame of bifocal glasses having a nose piece pad capable of sliding in a vertical direction is well known as described in JP-A-2010-044193, and an eyeglass-type electronic device including a posture-changeable nose pad that forms a human-body-feature detecting device is also well known as described in WO 2016/052168.

However, in the case of configurations described in JP-A-2017-147522, JP-A-2010-044193, and WO 2016/052168, it cannot be said that the nose pad in the virtual-image display device can be adjusted easily and rapidly in a manner that meets various requests.

SUMMARY

A virtual-image display device according to the invention includes a pad that is brought into contact with a nose of a viewer, a supporting portion configured to support the pad, and a rotation adjustment mechanism configured to allow the pad to axially rotate to change a posture with respect to the supporting portion while restricting the axial rotation at a predetermined position.

In the case of the virtual-image display device described above, the rotation adjustment mechanism is configured to allow the pad, which is brought into contact with the nose of the viewer, to axially rotate to change its posture while restricting the axial rotation at a predetermined position. This configuration enables the nose pad to be positioned in place, in other words, enables the visual recognition position in the virtual-image display device to be adjusted in an easy and rapid manner using a method of rotating the pad and retaining it at an appropriate position, thereby meeting various requirements, for example, that unspecified individuals make adjustment according to the shape of their own nose.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Exemplary Embodiment

Below, an example of a head mounted display, which serves as a virtual-image display device according to First Exemplary Embodiment of the invention, will be described in detail with reference to FIGS. 1A and 1B and the like.

Figure 1A:
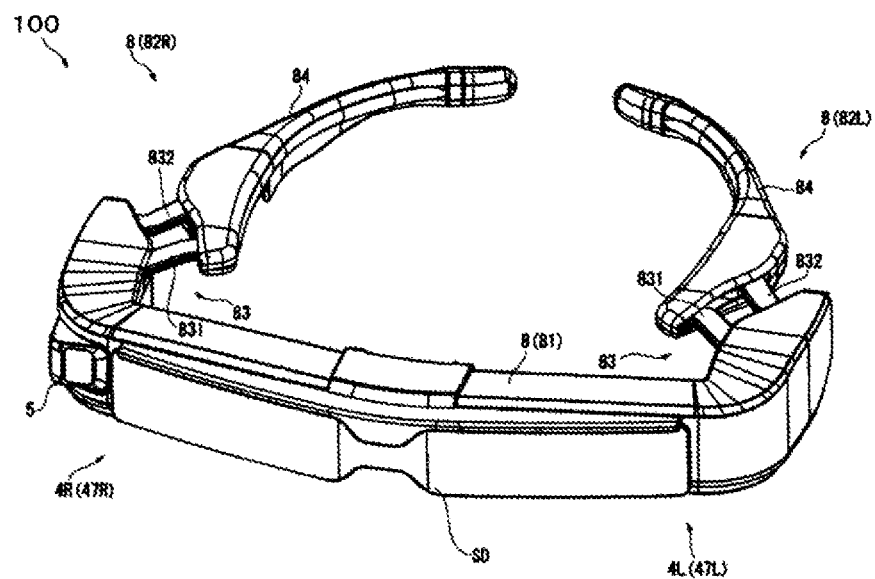
FIG. 1A is a perspective view illustrating an example of a virtual-image display device according to First Exemplary Embodiment.
Figure 1B:
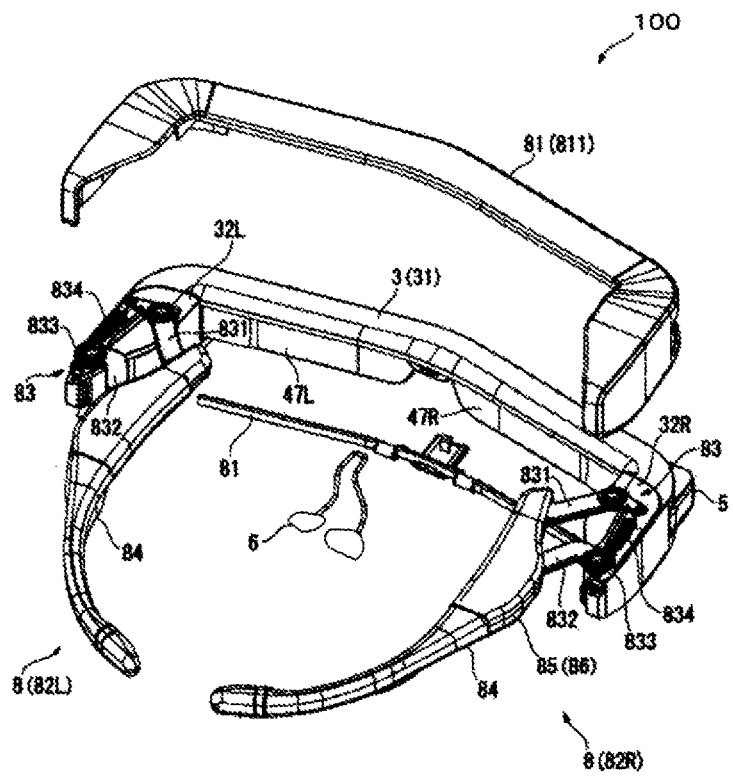
FIG. 1B is an exploded perspective view illustrating an example of the virtual-image display device according to First Exemplary Embodiment.

As schematically illustrated in FIGS. 1A and 1B, a head mounted display 100, which serves as one example of a virtual-image display according to this exemplary embodiment, is a head-mounted image display device used by a viewer who wears the device on the head portion thereof, and is an image display device that allows the viewer or a user to visually recognize an imaged light (image light). Here, as one example, the head mounted display 100 is of see-through type that provides the viewer with visual recognition in a state where an image resulting from an image light is superimposed on the external image.

As illustrated in the drawings, the head mounted display 100 has an external appearance that looks like eyeglasses having a configuration of right-left pair, and includes a frame 3 that supports each component for displaying, two optical devices 4, each of which is attached to the frame 3, and an imaging device 5. The head mounted display 100 also includes a nose pad 6 that serves as a supporting member of the device for a viewer, and temples 8 configured to be a pair of right and left. Note that, of the two optical devices 4, the optical device on the left side is referred to as an optical device 4L, and the optical device on the right side is referred to as an optical device 4R. In addition to the components described above, the head mounted display 100 includes a detachable shielding member 7.

It should be noted that, in the following description, when the viewer who wears the head mounted display 100 is viewed from the front, the side on which the head mounted display 100 is viewed is referred to as a front surface side or forward, and the opposite side is referred to as a back surface side or backward. In addition, the upper side and the down side of the head mounted display 100 correspond to the upper side and the down side of the viewer, respectively. Furthermore, the right side and the left side of the head mounted display 100 correspond to the right side and the left side, respectively, of the viewer who wears the head mounted display 100.

The frame 3 has a configuration similar to the frame of eyeglasses. The frame 3 supports the optical devices 4L, 4R and the imaging device 5, and also supports the nose pad 6 that serves as the supporting member of the device relative to the viewer, and the shielding member 7. Note that the frame 3 includes a frame body 31 having a substantially U-shape as viewed from above, and case members 32L, 32R that are attached to the frame body 31 and accommodate part of the optical devices 4L, 4R.

The optical devices 4L, 4R each form and project an imaged light based on image signals inputted from the outside to cause the viewer to recognize the images with left and right eyes of the viewer. More specifically, the optical devices 4L, 4R form an imaged light based on the image signals inputted from the outside through a cable under control made by a control unit, not illustrated, and include prism-shaped light guiding members 47L, 47R, respectively, that each extend from the side of the head portion of the viewer toward the front side of eyes to guide the formed imaged light to in front of eyes, thereby enabling the viewer to visually recognize virtual images. In the case of this exemplary embodiment, for example, a self-luminous display device such as an organic EL panel is used to form the imaged light. However, the exemplary embodiment is not limited to this configuration, and it may be possible to be configured by combining a light source such as LED with a transmissive or reflective liquid crystal panel, or an optical modulation device such as a device employing a micromirror such as an MEMS mirror.

The imaging device 5 is disposed on the right surface side of the frame 3, and transmits an image obtained by imaging the external world, to the control unit. This enables the viewer to visually recognize the captured image, for example, with the optical devices 4L, 4R.

The nose pad 6 is inserted into and supported by the frame 3, and sandwiches the nose from left and right, for example, sandwiches the wings of the nose of the viewer when the head mounted display 100 is worn. This prevents the head mounted display 100 from displacing toward left or right or downward. In this case, the viewer supports the head mounted display 100 by viewer's nose. In other words, the nose bears the load of the weight of the head mounted display 100. In this exemplary embodiment, the nose pad 6 is configured to be able to rotate to adjust the posture thereof while restricting the rotation at a certain position, thereby being able to make adjustment according to the shape of the nose of the viewer. The structure of the nose pad 6 will be described later in detail with reference to FIGS. 2A and 2B and the like.

The temples 8 cooperate with the nose pad 6 to set the wearing position of the head mounted display 100 relative to the viewer with these temples sandwiching the side of the head portion of the viewer. Thus, the temples 8 include a left-side temple 82L disposed on the left side, a right-side temple 82R disposed on the right side, and a cover member 81. The cover member 81 includes a cover body 811 and an attachment member 812. The cover body 811 is formed into a substantially U-shape along the frame 3. The attachment member 812 is fixed to the cover body 811 so as to extend along the end edge, on the back surface side, of the front portion of the cover body 811. The attachment member 812 allows the shielding member 7 to rotate, and also allows the shielding member 7 to be detachably attached. Note that the outline of supporting and fixing of the device with respect to the viewer using the temple 8 will be described later.

The shielding member 7 is a detachable plate-shaped member. When worn, this shielding member is disposed on the back surface side or directly outside with respect to the light guiding members 47R, 47L that form the optical devices 4L, 4R, respectively, to block at least part of the external light entering the light guiding members 47R, 47L to make the outside world less visible, thereby improving visibility of the displayed image.

Below, the configuration of the temples 8 will be described in more detail to explain the outline of the way in which the head mounted display 100 is supported with the temple 8, in other words, the way in which the head mounted display 100 is fixed to the head portion of the viewer in a sandwiched manner with the temple 8.

As illustrated in the drawings, of the temples 8, for example, the right-side temple 82R is located on the right side with respect to the head portion of the viewer. The right-side temple 82R is brought into contact with the right side of the head portion of the viewer and the right-side portion of the back of viewer's head to sandwich the head portion of the viewer cooperating with the left-side temple 82L located on the left side. Thus, the right-side temple 82R and the left-side temple 82L are each configured to include a link mechanism 83 and a contact portion 84.

In the right-side temple 82R, the link mechanism 83 includes a first link 831, a second link 832, a base member 833, and an energizing portion 834 comprised of a spring or the like. With these portions being provided, in a case where the right-side temple 82R is moved in a direction in which the entire contact portion 84 is spaced apart from the left-side temple 82L and the head portion, the energizing portion 834 causes a force acting so as to push back. Similarly, in a case where the left-side temple 82L is moved in a direction in which the entire contact portion 84 is spaced apart from the right-side temple 82R and the head portion, a force acting so as to push back is caused.

With the configuration as described above, the temples 8 can fix the head mounted display 100 on the head portion of the viewer from both sides thereof. In particular, with the configuration as described above, it is possible to sandwich the head portion regardless of the size or shape of the head portion of the viewer. Thus, it is possible to easily achieve a usage mode in which one head mounted display 10 is shared with the unspecified number of viewers especially including those who wear eyeglasses and those who do not wear eyeglasses. Note that, from viewpoint of a viewer, the temples 8 and the nose pad 6 are in contact with part of the side of the head portion such as the upper side of an ear and part of the nose, and the viewer supports the head mounted display 100 at these contacting portions. In other words, a force acts on these contacting portions.

Here, in particular, in the case where the head mounted display 100 is used by the unspecified number of viewers as described above, it is desirable to similarly configure the nose pad 6, which serves as another supporting member or contacting portion for the viewer, so as to be adaptive to differences of individual viewers.

In general, in the case where the nose pad is used by the unspecified number of viewers, it is considered that the nose pad needs to be adjusted according to the difference in the shape such as the height of the nose of each of the viewers. In this regard, the nose pad 6, which serves as one example of the nose pad for the virtual-image display device according to this exemplary embodiment, includes a rotation adjustment mechanism SA that allows the pad 61L, 61R illustrated in FIG. 2A and the like to rotate and change its posture while restricting the rotation at a certain position. This enables the nose pad 6 to be positioned in place, in other words, enables the visual recognition position in the head mounted display 100, which serves as the virtual-image display device, to be adjusted in an easy and rapid manner.

Below, one example of the configuration of the nose pad according to this exemplary embodiment will be described in detail with reference to FIGS. 2A and 2B and the like.

Figure 2A:
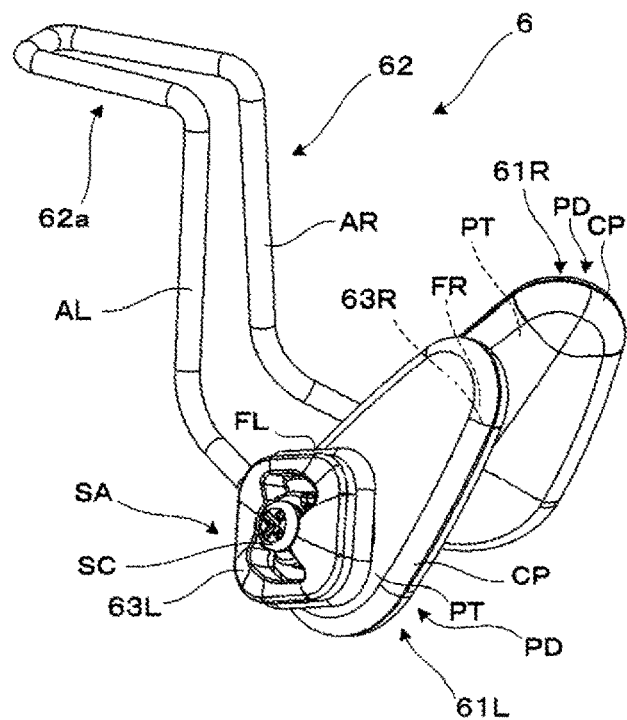
FIG. 2A is a perspective view illustrating an example of a nose pad for the virtual-image display device according to First Exemplary Embodiment.
Figure 2B:
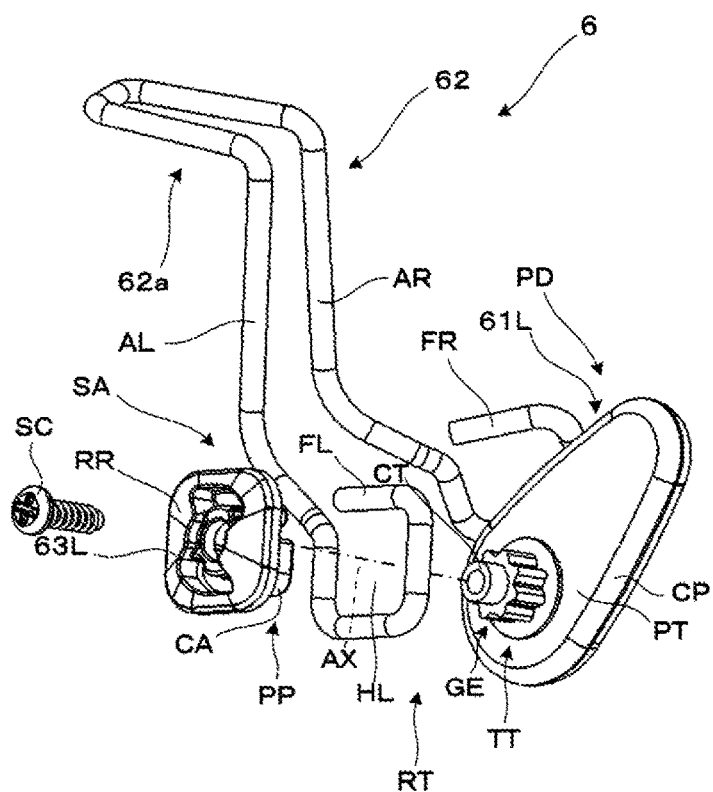
FIG. 2B is an exploded perspective view illustrating an example of the nose pad for the virtual-image display device according to First Exemplary Embodiment.

FIG. 2A is a perspective view illustrating the nose pad 6, which is an example of the nose pad for the virtual-image display device according to the exemplary embodiment, and FIG. 2B is an exploded perspective view illustrating the nose pad 6. Note that the structure on the left side and the structure on the right side are symmetrical with each other. Thus, FIG. 2B only illustrates the portion on the left side of the portion configured to be a pair of right and left, and the portion on the right side will be omitted.

As illustrated in the drawings, the nose pad 6 includes: a pair of left and right pads 61L, 61R, which serve as the main portions for the nose of the viewer to be brought into contact with; a nose pad arm 62 to which the pads 61L, 61R are attached; and a pair of left and right attachment portions 63L, 63R that attach the pads 61L, 61R to the nose pad arm 62. In addition to the components described above, a screw SC for attachment is also provided. Furthermore, in this exemplary embodiment, the rotation adjustment mechanism SA that allows the pads 61L, 61R to axially rotate while restricting the axial rotation at a certain position is provided, for example, by a combination of part of the components described above.

Figure 3:
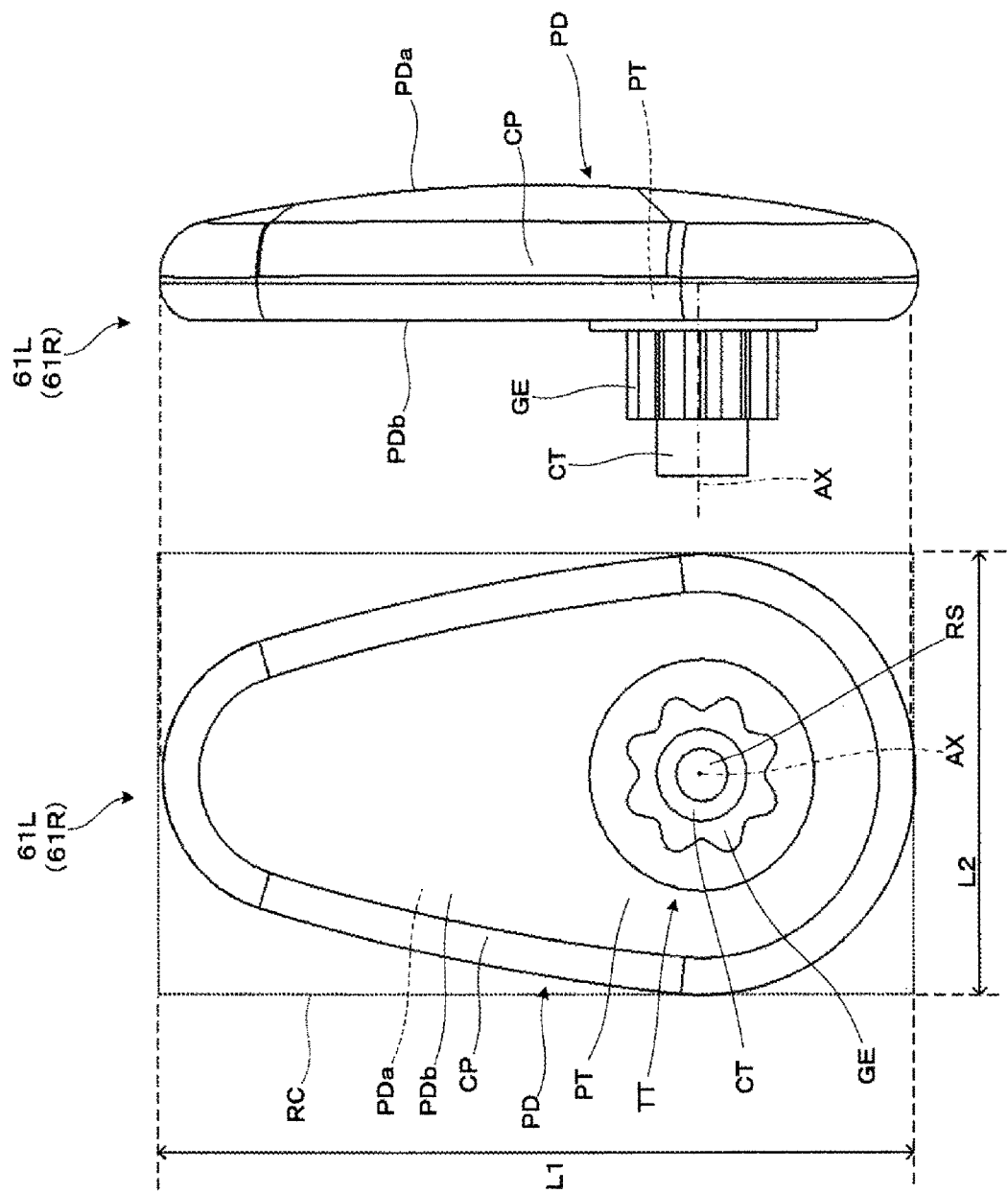
FIG. 3 illustrates an elevation view and a side view each illustrating a pad.
Figure 4:
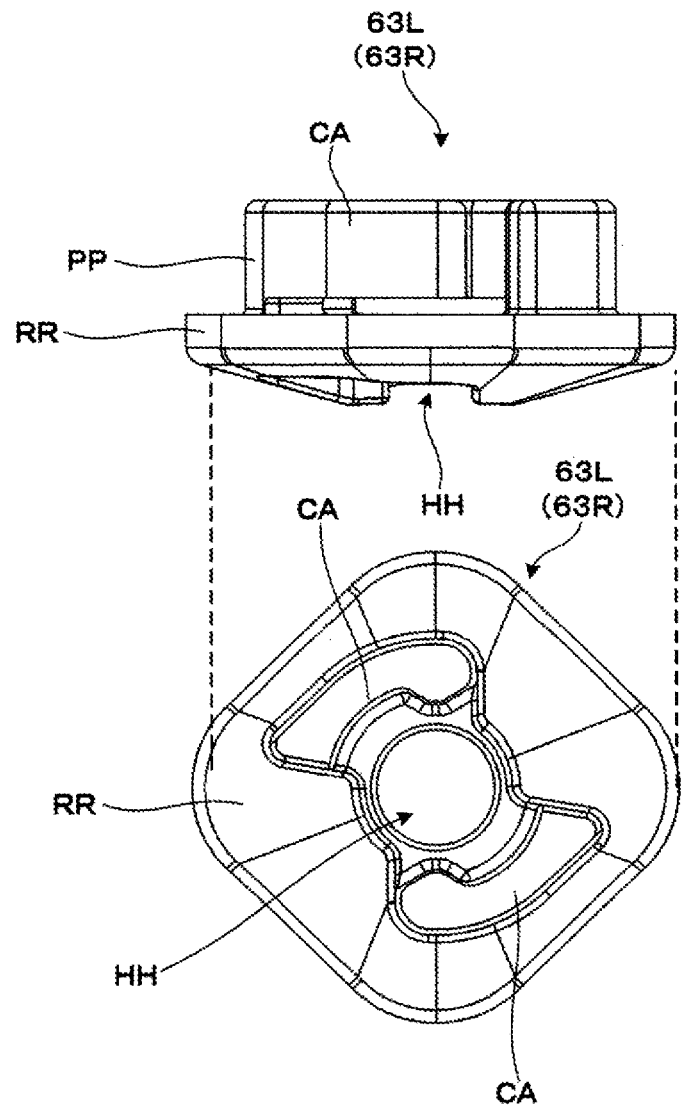
FIG. 4 illustrates a side view and an elevation view each illustrating an attachment portion.

It should be noted that FIG. 3 includes an elevation view and a side view each illustrating the pad 61L or pad 61R, and FIG. 4 includes a side view and an elevation view each illustrating the attachment portion 63L or attachment portion 63R.

As described above, the pads 61L, 61R are portions of the nose pad 6 that are brought into contact with the nose of the viewer. Thus, as illustrated in FIG. 3 and the like, for example, the left-side pad 61L includes a main body portion PD that includes a flat-plate-shaped portion made of resin or the like and integrally formed through resin molding, and a cover member CP that is made of silicone rubber and covers the flat-plate-shaped main body portion PD. Here, the main body portion PD includes a plate-shaped portion PT that forms a main portion that causes a surface PDa covered with a cover member CP to be brought into contact with the nose of the viewer. The main body portion PD also includes a pad-side protruding portion TT that extends from an exposed portion, not covered with the cover member CP, of a back surface PDb side of the plate-shaped portion PT, the back surface PDb side being to be attached to the nose pad arm 62. The pad-side protruding portion TT is provided with a recessed portion RS that is located at the center thereof and allows screw-fastening with a screw SC. Although not illustrated, the inner surface of the recessed portion RS is threaded so as to correspond to the screw SC (see FIGS. 2A and 2B).

In a state of being attached as illustrated in FIG. 2A, the pad 61L is configured to be able to rotate with the rotational center axis being the axis AX, which is located at the center of a central shaft portion CT that extends along a direction perpendicular to the surface of the plate-shaped portion PT illustrated in FIG. 2B and the like. Furthermore, as illustrated in FIG. 3, when the surface of the plate-shaped portion PT of the pad 61L is viewed from the front, the plate-shaped portion PT or a portion of the plate-shaped portion PT that has the cover member CP provided thereon is shaped into a non-rotational symmetry with respect to the axis AX. In other words, the shape of the surface PDa, which serves as a contacting surface with the nose, is formed into a non-concentric circle shape with respect to the center of rotation. In the example illustrated in the drawing, the shape of the surface PDa is shaped such that a portion of the oblong shape that is closer to the central shaft portion CT is expanded. More specifically, the axis AX first passes through a point, other than the center, on the longer axis of the oblong shape, and the surface PDa is shaped such that the portion of the oblong shape on the side closer to the point, through which the axis AX passes, is expanded in a direction perpendicular to the longer axis of the oblong shape. Note that, in the example illustrated in the drawing, this expansion is provided so as to be axial symmetry with respect to the longer axis. In the case where the surface of the pad 61L, in other words, the surface PDa is shaped as described above, this shape is a non-concentric circle shape with respect to the point through which the axis AX passes. Thus, the pad 61L changes its posture with respect to the nose pad arm 62 in association with the rotation. In other words, the pad 61L changes to take different postures with respect to the nose of the viewer. In addition, in a case where the viewpoint is changed in terms of the shape of the pad 61L illustrated in FIG. 3 and the rectangular RC, which is circumscribed around the surface shape of the pad 61L in front view, is given as indicated by the broken line, the length L1 of each of the pair of opposing sides with respect to the direction of the symmetry axis passing through the axis AX is longer than the length L2 of each of the other pair of opposing sides. As described above, since the shape of the pad 61L has the non-concentric circle shape, the contacting area can be longer or greater than that in the case where the pad 61L has a concentric circle shape. Thus, the viewer can rotate the pad 61L to distribute the pressure caused by the weight of the head mounted display 100, thereby changing the pad to a position preferable to the user. Note that the pad 61R on the right side has a configuration similar to that of the pad 61L on the left side.

Next, returned to FIGS. 2A and 2B, the nose pad arm 62 is a supporting portion to which the pads 61L, 61R are attached to support the pads 61L, 61R. The nose pad arm 62 is inserted into the frame 3 (see FIG. 1) to be fixed to the main body side. In order for the nose pad arm 62 to function as the supporting portion for the pads 61L, 61R as described above, the nose pad arm 62 is formed, for example, using one line-shaped metal member that has been bent, or a resin member having a curved shape.

The nose pad arm 62 includes a U-shaped insert portion 62a that is inserted into the frame 3 (see FIG. 1), a pair of left and right arm portions AL, AR that each extend from the insertion portion 62a, and frame-shaped portions FL, FR that serve as a pair of fixing portions that form the top end sides of the arm portions AL, AR, respectively. The frame-shaped portions FL, FR have a non-circular frame-body shape, and here, have a rectangular shape as an example. However, the rectangular shape as used herein include a shape having corner portions with a slightly round shape. The nose pad arm 62 is attached to the pads 61L, 61R at the frame-shaped portions FL, FR through the attachment portions 63L, 63R, thereby supporting the pads 61L, 61R.

Next, as illustrated in FIG. 4 and the like, the attachment portions 63L, 63R are tubular-shaped bodies that have a side-surface shape with a rectangular shape in front view, and have, at the center thereof, a through hole HH that allows the screw SC (see FIGS. 2A and 2B) to be inserted, in order to fit the frame-shaped portions FL, FR. The attachment portions 63L, 63R are each formed integrally using resin. Of the attachment portions 63L, 63R, for example, the attachment portion 63L on the left side includes an attachment-portion-side protruding portion PP that extends in a tubular shape so as to correspond to the pad-side protruding portion TT (see FIG. 3), and a flange portion RR that is formed on the side of the attachment-portion-side protruding portion PP, this side being opposite to the side (see FIG. 2B) on which the pad 61L is attached.

Here, as an example, the attachment-portion-side protruding portion PP is set to be slightly smaller relative to the rectangular hole HL formed by the frame-shaped portion FL of the nose pad arm 62, and the flange portion RR is set to be slightly larger relative to the hole HL, as illustrated in FIG. 2B. Thus, once the pad 61L, the frame-shaped portion FL of the nose pad arm 62, and the attachment portion 63L are attached together through screwing using the screw SC, the pad 61L is brought into a state of sandwiching the frame-shaped portion FL cooperating with the attachment portion 63L, as illustrated in FIG. 2A. Note that the right side also has a configuration similar to that of the left side.

As described above, in this exemplary embodiment, the frame-shaped portion FL of the nose pad arm 62, the pad-side protruding portion TT of the pad 61L, and the attachment-portion-side protruding portion PP and the flange portion RR of the attachment portion 63L are assembled together to work in a cooperative manner. These function as the rotation adjustment mechanism SA that allows the pad 61L to axially rotate to change its posture with respect to the nose pad arm 62 serving as the supporting portion while restricting the axial rotation at a certain position. In other words, the rotation adjustment mechanism SA includes the pad-side protruding portion TT, the frame-shaped portion FL, and the attachment portion 63L.

Below, the structure of each portion that forms the rotation adjustment mechanism SA will be described.

First, the pad-side protruding portion TT and the attachment-portion-side protruding portion PP of the attachment portion 63L form a ratchet structure portion RT. More specifically, as the ratchet structure portion RT, the pad-side protruding portion TT includes a gear mechanism GE that has a recessed portion RS at the center and has plural teeth that are formed along the circumferential direction of the central shaft portion CT extending along the axis AX. On the other hand, the attachment-portion-side protruding portion PP of the attachment portion 63L has a pair of hook mechanisms CA, CA that correspond to the gear mechanism GE. Note that, as illustrated in FIG. 4, the pair of hook mechanisms CA, CA are formed as a pair so as to match opposing corners of the attachment-portion-side protruding portion PP having a rectangular shape in front view. After attachment, the gear mechanism GE meshes with the pair of hook mechanisms CA, CA. This enables the pad 61L to rotate by a certain angle with the axis AX being the central axis of the rotation. In the example illustrated in the drawing, eight teeth are provided at equal intervals in the gear mechanism GE, and the gear mechanism GE rotates by 45°, in other words, changes its posture.

In addition, at the time of rotation as described above, the frame-shaped portion FL of the nose pad arm 62 has a non-circular rectangular shape, and in association with this, the attachment portion 63L also has a rectangular shape. As described above, the frame-shaped portion FL and the attachment portion 63L function as the fixed-side member for rotational operation of the pad 61L. In other words, the frame-shaped portion FL and the attachment portion 63L have a non-circular shape with respect to the center of rotation of the pad 61L, and hence, it can be said that these portions function as a rotation restricting portion that allows the pad 61L to rotate while restricting the rotation of the rotation restricting portion itself.

Furthermore, with the ratchet structure portion and the rotation restricting structure being provided as described above, the rotation adjustment mechanism SA allows the pad 61L to rotate by a certain angle to change the posture with respect to the nose pad arm 62 in a stepwise manner, and also allows the posture to be maintained at the changed certain position.

In addition, by appropriately adjusting the degree of fitting of the frame-shaped portion FL and the attachment-portion-side protruding portion PP each having a rectangular shape, in other words, giving a looseness to some degree, or appropriately adjusting the degree of tightness of screwing using the screw SC, it is possible to allow the pad 61L to maintain the state where there is a looseness to some degree with the frame-shaped portion FL of the nose pad arm 62 while restricting the rotation of the pad 61L, more specifically, maintaining the state of the fixed angle or posture using the ratchet structure without changing. With this configuration, it is possible to achieve fitting according to the exact shape of the nose of the viewer, as is the case with the pad of general eyeglasses.

Figure 5A:
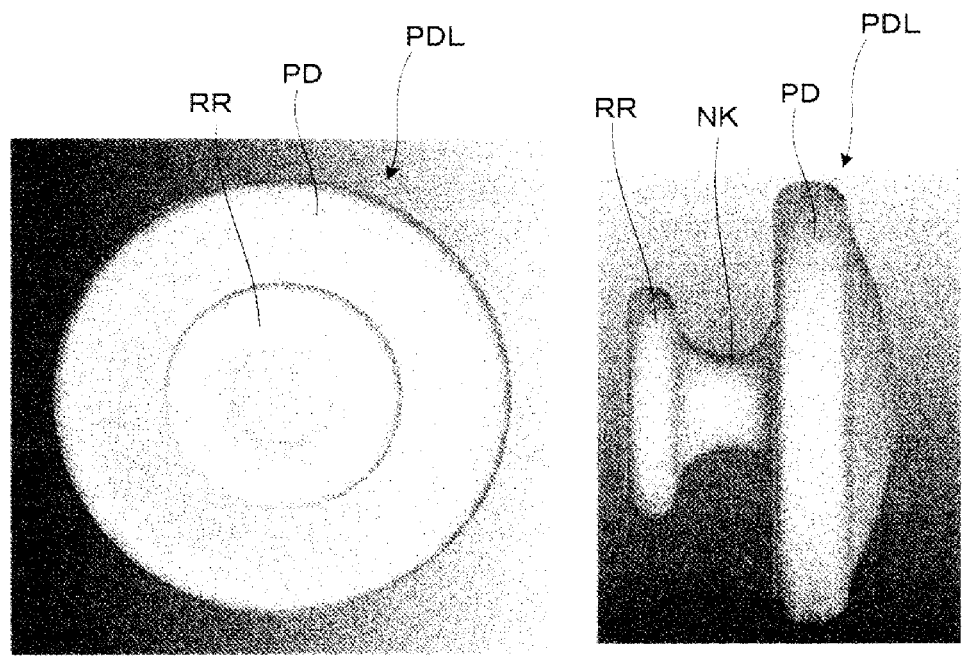
FIG. 5A illustrates an elevation view and a side view each illustrating a pad according to a comparative example.
Figure 5B:
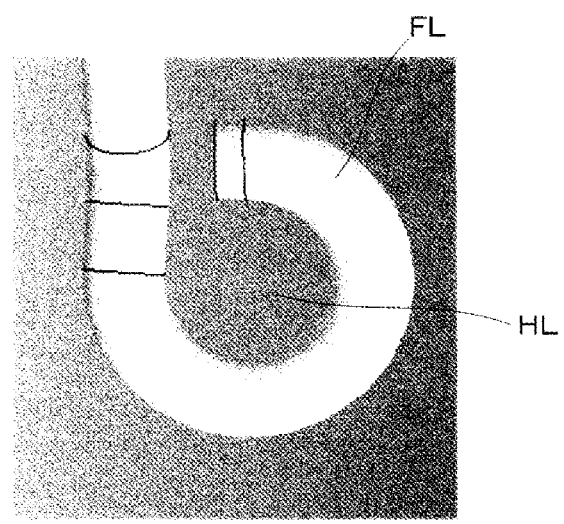
FIG. 5B is an elevation view illustrating a frame-shaped portion according to a comparative example.

FIG. 5A illustrates an elevation view and a side view each illustrating a pad according to a comparative example, and is a diagram corresponding to FIG. 3. In addition, FIG. 5B is an elevation view illustrating a frame-shaped portion according to a comparative example. In the comparative example illustrated in the drawings, first, a pad PDL includes a narrowed portion NK provided so as to extend from a main body portion PD having a disk shape, and a flange portion RR, as illustrated in FIG. 5A. In addition, as illustrated in FIG. 5B, the frame-shaped portion FL has a circular hole HL that corresponds to the narrowed portion NK of the pad PDL. The configuration as described above also allows the pad PDL to axially rotate. However, in this case, all the portions have the circular shape, and only rotate concentrically. Thus, unlike the present application, it is not possible to achieve the operation in which the pad can rotate to change its posture while restricting the rotation at a certain position. In particular, the pad PDL has a circular shape, and only rotates concentrically. Thus, the posture with respect to the nose pad arm 62 does not change, which makes it unable to make positional adjustment according to the nose.

Figure 6A:
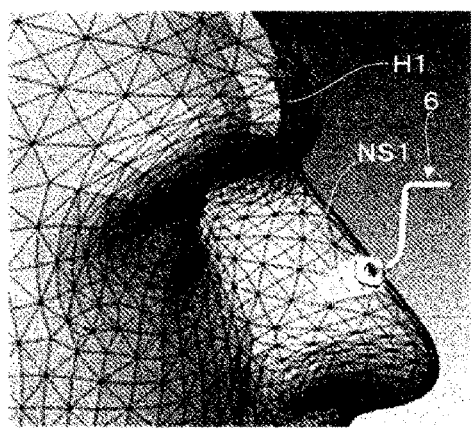
FIG. 6A is a diagram illustrating an example of the posture of the pad of which shape has been changed according to the shape of the nose of a viewer.
Figure 6B:
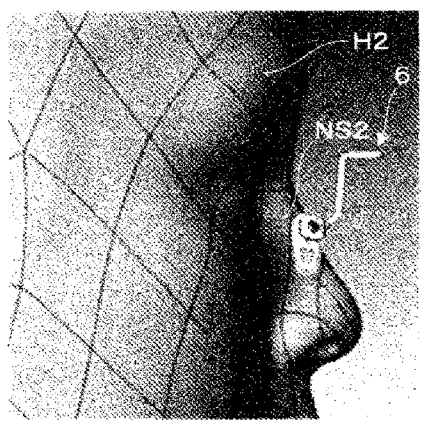
FIG. 6B is a diagram illustrating another example of the posture of the pad of which shape has been changed according to the shape of the nose of a viewer.
Figure 6C:
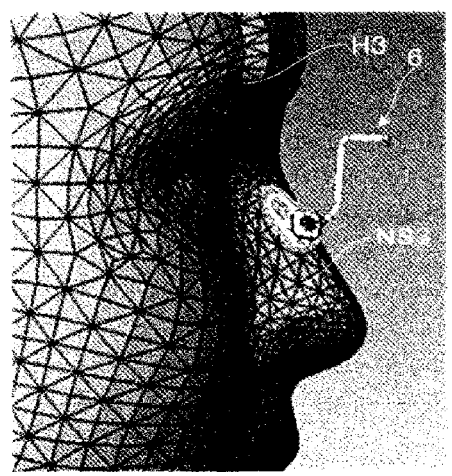
FIG. 6C is a diagram illustrating yet another example of the posture of the pad of which shape has been changed according to the shape of the nose of a viewer.

On the contrary, in the case of the present application, it is possible to easily and rapidly change into various postures according to the shape of each of the noses NS1 to NS3 of plural viewers H1 to H3, as illustrated, for example, in FIGS. 6A to 6C that are given as examples.

As described above, in the case of this exemplary embodiment, the rotation adjustment mechanism SA is configured to allow the pad 61L, 61R, which is brought into contact with the nose of the viewer, to axially rotate to change its posture while restricting the axial rotation at a predetermined position. This configuration enables the nose pad 6 to be positioned in place, in other words, enables the visual recognition position in the head mounted display 100, which serves as the virtual-image display device, to be adjusted in an easy and rapid manner by a method of rotating the pad 61L, 61R and retaining it at an appropriate position, thereby meeting various requirements made by unspecified individuals such as making adjustment according to the shape of their own nose.

Second Exemplary Embodiment

Below, a head mounted display and a nose pad for the head mounted display according to Second Exemplary Embodiment will be described with reference to FIGS. 7A and 7B and the like. This exemplary embodiment is a modification example of First Exemplary Embodiment, and is similar to First Exemplary Embodiment except for the nose pad and the ratchet structure portion. Thus, the same names and reference characters are used for those having the same function, and detailed explanation thereof will not be repeated. In particular, illustration and description of the entire head mounted display will not be made.

Figure 7A:
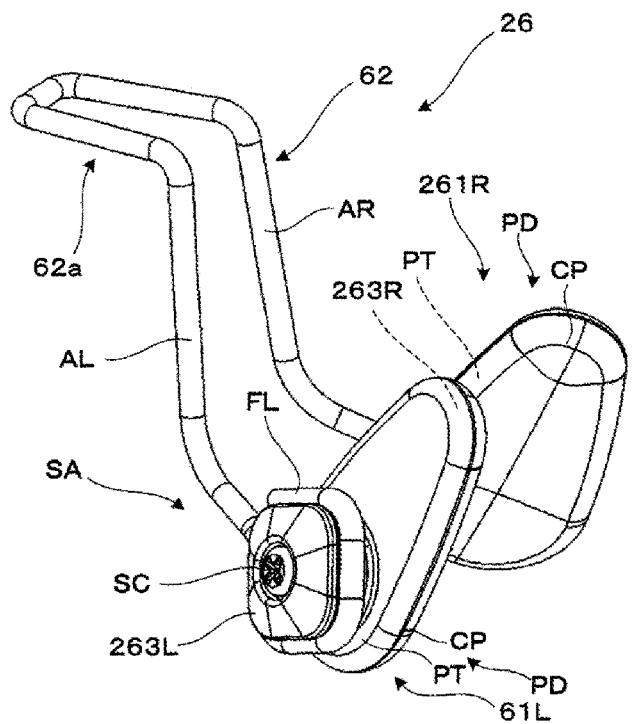
FIG. 7A is a perspective view illustrating an example of a nose pad for the virtual-image display device according to Second Exemplary Embodiment.
Figure 7B:
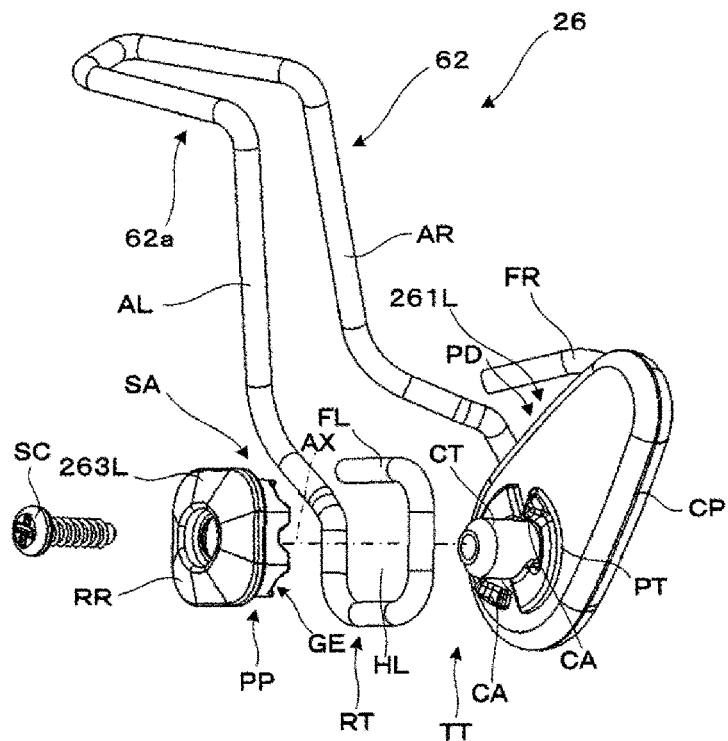
FIG. 7B is an exploded perspective view illustrating an example of the nose pad for the virtual-image display device according to Second Exemplary Embodiment.

FIG. 7A is a perspective view illustrating a nose pad 26, which is an example of the nose pad for the virtual-image display device according to the exemplary embodiment, and FIG. 7B is an exploded perspective view illustrating the nose pad 26. Note that the structure on the left side and the structure on the right side are symmetrical with each other. Thus, FIG. 7B only illustrates the portion on the left side of the portion configured to be a pair of right and left, and the portion on the right side will be omitted.

As illustrated in FIGS. 7A and 7B, the nose pad 26 for the head mounted display according to this exemplary embodiment includes a pair of left and right pads 261L, 261R, which serve as the main portions, a nose pad arm 62 to which the pads 261L, 261R are attached, and a pair of left and right attachment portions 263L, 263R that attach the pads 261L, 261R to the nose pad arm 62. In addition to the components described above, a screw SC for attachment is also provided. Furthermore, the rotation adjustment mechanism SA that allows the pads 261L, 261R to axially rotate while restricting the axial rotation at a certain position is provided, for example, by a combination of part of the components described above.

Figure 8:
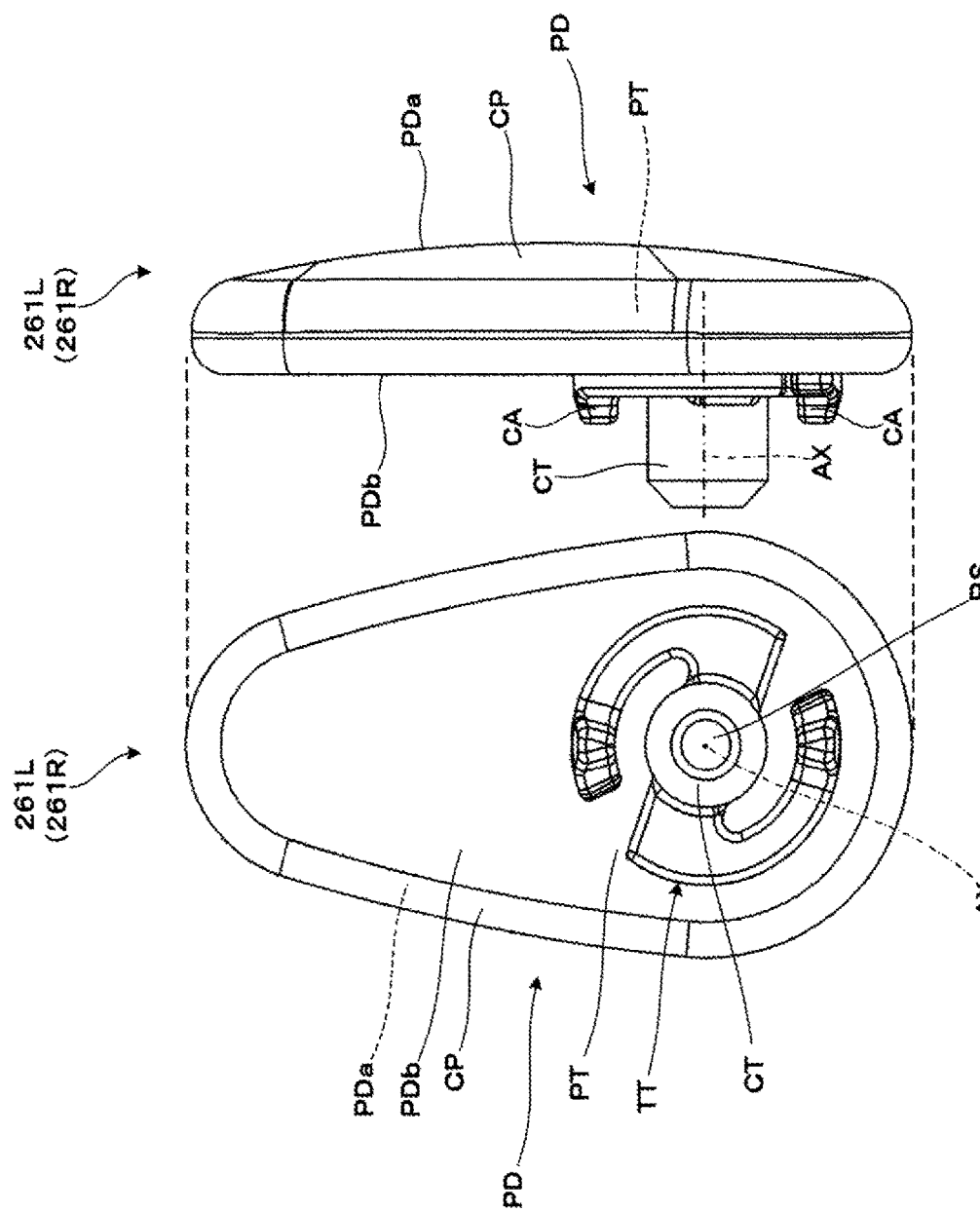
FIG. 8 illustrates an elevation view and a side view each illustrating a pad.
Figure 9:
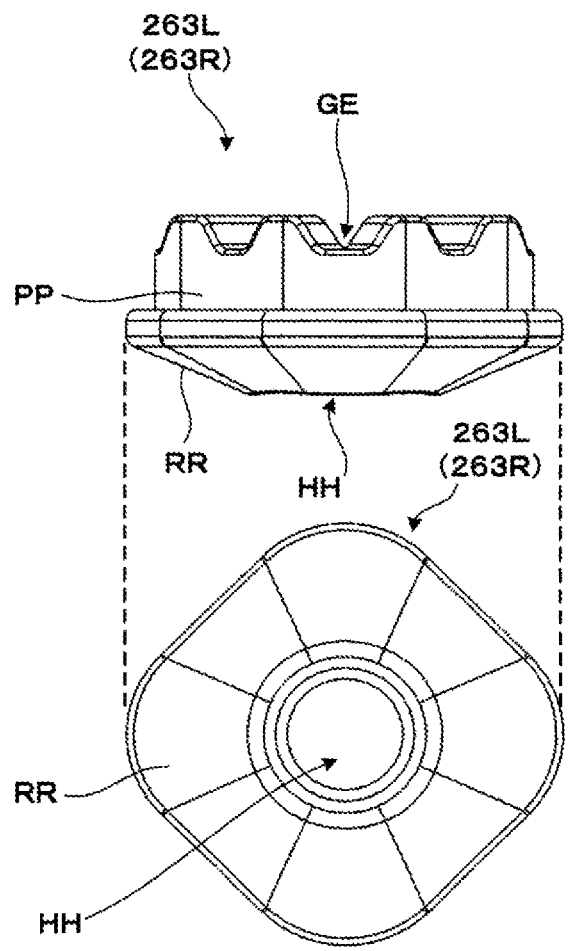
FIG. 9 illustrates a side view and an elevation view each illustrating an attachment portion.

It should be noted that FIG. 8 includes an elevation view and a side view each illustrating the pad 261L or pad 261R, and FIG. 9 includes a side view and an elevation view each illustrating the attachment portion 263L or attachment portion 263R.

As illustrated in the drawings, of the pads 261L, 261R, for example, the pad 261L on the left side includes a main body portion PD and a cover member CP, and also includes a pad-side protruding portion TT that includes a recessed portion RS on a side to be attached to the nose pad arm 62. Note that the pad 261R on the right side is similarly configured.

In addition, of the attachment portions 263L, 263R, for example, the attachment portion 263L on the left side includes an attachment-portion-side protruding portion PP that is provided so as to correspond to the pad-side protruding portion TT, and a flange portion RR that is formed on the side of the attachment-portion-side protruding portion PP, this side being opposite to the side on which the pad 261L is attached. Note that the attachment portion 263R on the right side is similarly configured.

Below, the structure of each portion that forms the rotation adjustment mechanism SA will be described. Note that the structure on the left side and the structure on the right side are symmetrical with each other. Thus, description will be made only of the structure on the left side, and the structure on the right side will be omitted.

First, the pad-side protruding portion TT and the attachment-portion-side protruding portion PP of the attachment portion 263L form a ratchet structure portion RT. More specifically, as the ratchet structure portion RT, the attachment-portion-side protruding portion PP includes a gear mechanism GE that has plural teeth that are formed along the circumferential direction of the axis AX. On the other hand, the pad-side protruding portion TT has a pair of hook mechanisms CA, CA that correspond to the gear mechanism GE. In other words, in the case of this exemplary embodiment, the positions where the gear mechanism and the hook mechanism are attached together are different from those in First Exemplary Embodiment.

Note that, as illustrated in FIG. 8, the pair of hook mechanisms CA, CA are provided so as to face each other in front view, and extend in a direction along the axis AX. On the other hand, the gear mechanism GE has a structure that has teeth that form recesses and projections in a direction along the axis AX.

As described above, in the case of this exemplary embodiment, the rotation adjustment mechanism SA is configured to allow the pad 261L, 261R, which is brought into contact with the nose of the viewer, to axially rotate to change its posture while restricting the axial rotation at a predetermined position. This configuration enables the nose pad 26 to be positioned in place, in other words, enables the visual recognition position in the head mounted display, which serves as the virtual-image display device, to be adjusted in an easy and rapid manner by a method of rotating the pad 261L, 261R and retaining it at an appropriate position, thereby meeting various requirements made by unspecified individuals such as making adjustment according to the shape of their own nose.

Third Exemplary Embodiment

Below, a head mounted display and a nose pad for the head mounted display according to a Third Exemplary Embodiment will be described with reference to FIGS. 10A and 10B and the like. This exemplary embodiment is a modification example of the First Exemplary Embodiment, and is similar to the First Exemplary Embodiment except for the structure of the nose pad. Thus, the same names and reference characters are used for those having the same function, and detailed explanation thereof will not be repeated. In particular, illustration and description of the entire head mounted display will not be made.

Figure 10A:
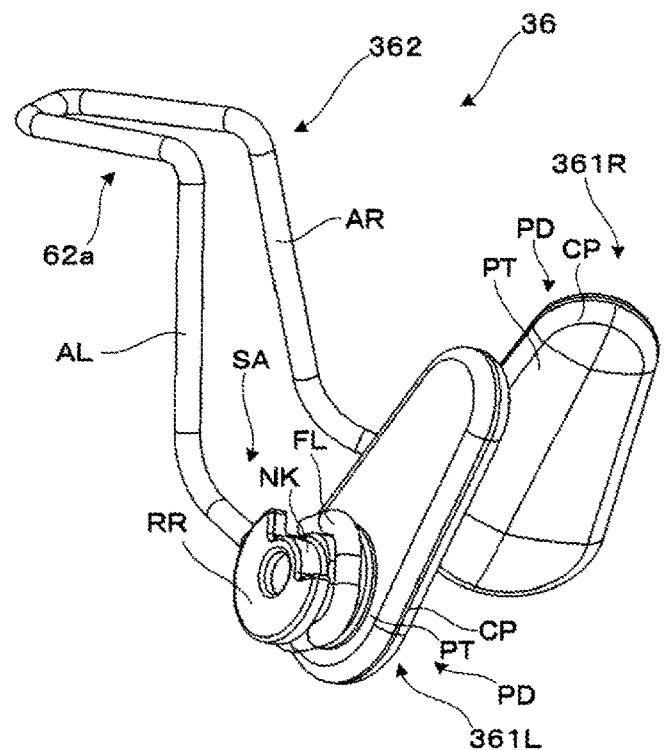
FIG. 10A is a perspective view illustrating an example of a nose pad for a virtual-image display device according to Third Exemplary Embodiment.
Figure 10B:
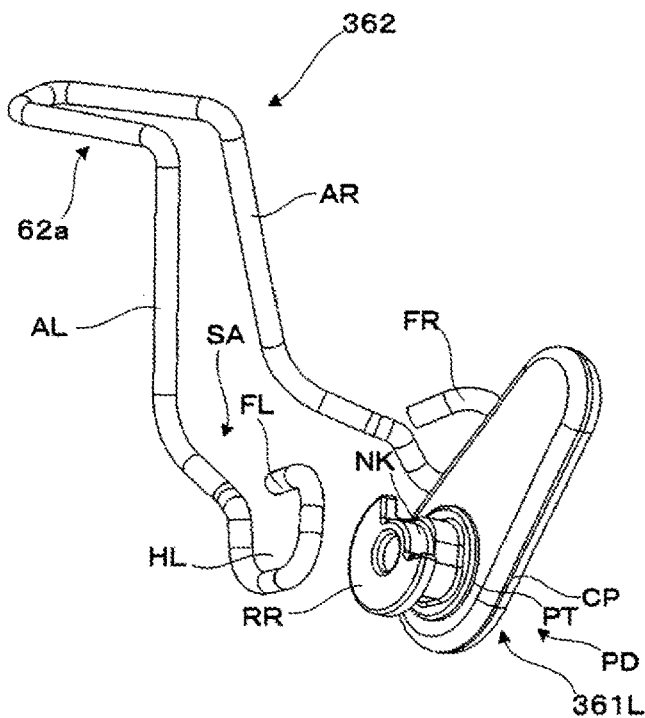
FIG. 10B is an exploded perspective view illustrating an example of the nose pad for the virtual-image display device according to Third Exemplary Embodiment.

FIG. 10A is a perspective view illustrating an example of a nose pad for the head mounted display according to this exemplary embodiment, and FIG. 10B is an exploded perspective view illustrating the nose pad. Note that the structure on the left side and the structure on the right side are symmetrical with each other. Thus, FIG. 10B only illustrates the portion on the left side of the portion configured to be a pair of right and left, and the portion on the right side will be omitted. As illustrated in FIGS. 10A and 10B, a nose pad 36 according to this exemplary embodiment includes a pair of left and right pads 361L, 361R, which serve as the main portions, and a nose pad arm 362 to which the pads 361L, 361R are attached. In this exemplary embodiment, the rotation adjustment mechanism SA that allows the pads 361L, 361R to axially rotate while restricting the axial rotation at a certain position is provided, for example, by a combination of part of the components described above. In other words, this exemplary embodiment differs from other exemplary embodiments in that the rotation adjustment mechanism SA has a structure in which no attachment portion or screw, which is employed in the First Exemplary Embodiment and the like, is not provided.

Figure 11:
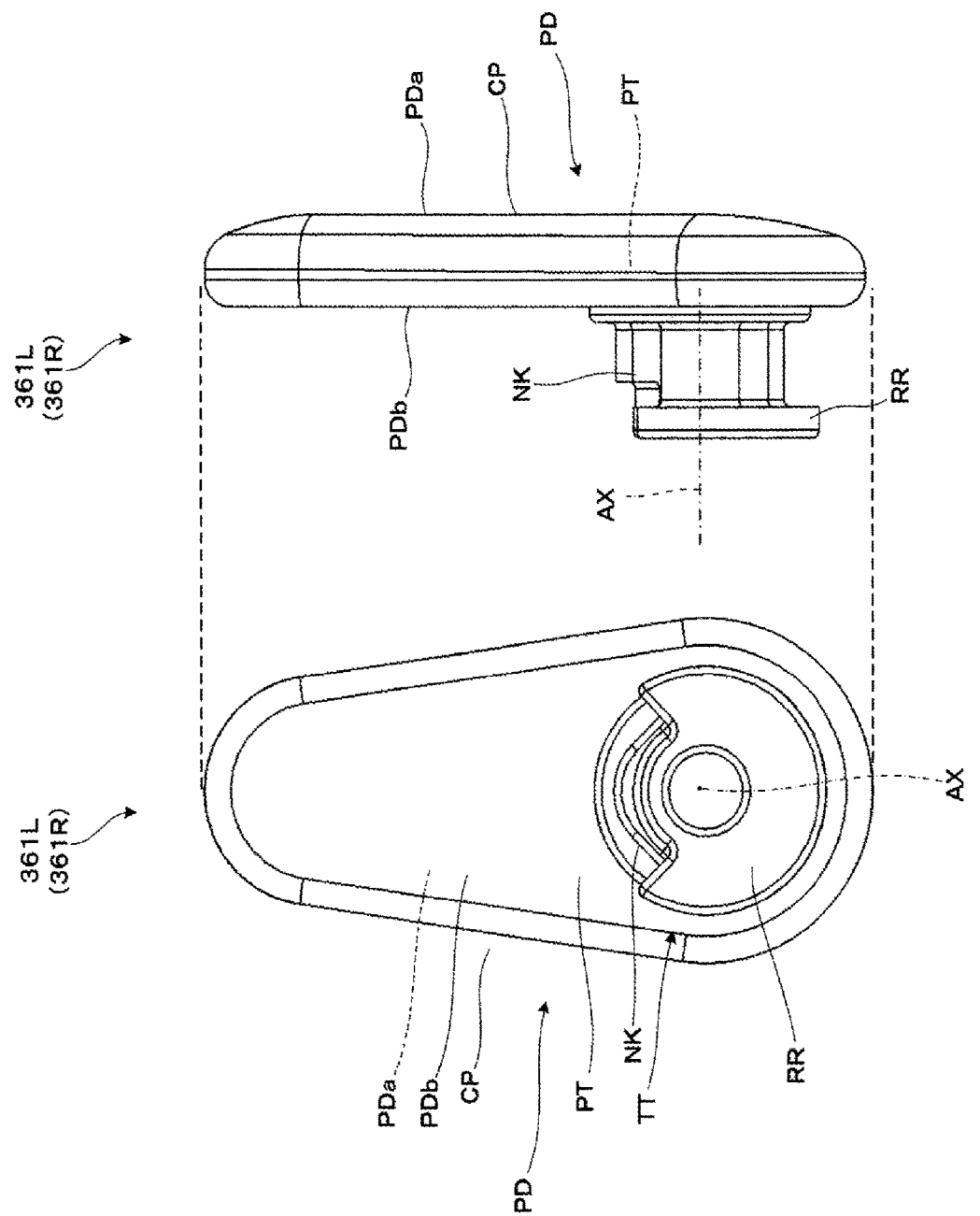
FIG. 11 illustrates an elevation view and a side view each illustrating a pad.

Note that FIG. 11 illustrates an elevation view and a side view each illustrating a pad 361L or pad 361R.

As illustrated in the drawings, of the pads 361L, 361R, for example, the pad 361L on the left side includes a main body portion PD and a cover member CP, and also includes a pad-side protruding portion TT on a side thereof to be attached to the nose pad arm 362. Note that the pad 361R on the right side is similarly configured.

In this exemplary embodiment, the frame-shaped portion FL of the nose pad arm 362 and the pad-side protruding portion TT of the pad 361L are assembled together to work in a cooperative manner. These function as the rotation adjustment mechanism SA that allows the pad 361L to axially rotate to change its posture with respect to the nose pad arm 362 serving as the supporting portion while restricting the axial rotation at a certain position. In other words, the rotation adjustment mechanism SA includes the pad-side protruding portion TT and the frame-shaped portion FL.

Below, the structure of each portion that forms the rotation adjustment mechanism SA will be described.

First, the pad-side protruding portion TT according to this exemplary embodiment includes a narrowed portion NK provided so as to extend from an exposed portion, not covered with the cover member CP, of the side to be attached to the nose pad arm 362, in other words, of the back surface PDb side of the plate-shaped portion PT, and also includes a flange portion RR that further extends from the narrowed portion NK.

The narrowed portion NK is formed into a pillar-shaped body or tubular body that has a side-surface shape with a rectangular shape in front view in order to fit the frame-shaped portions FL, FR of the nose pad arm 362.

Figure 12:
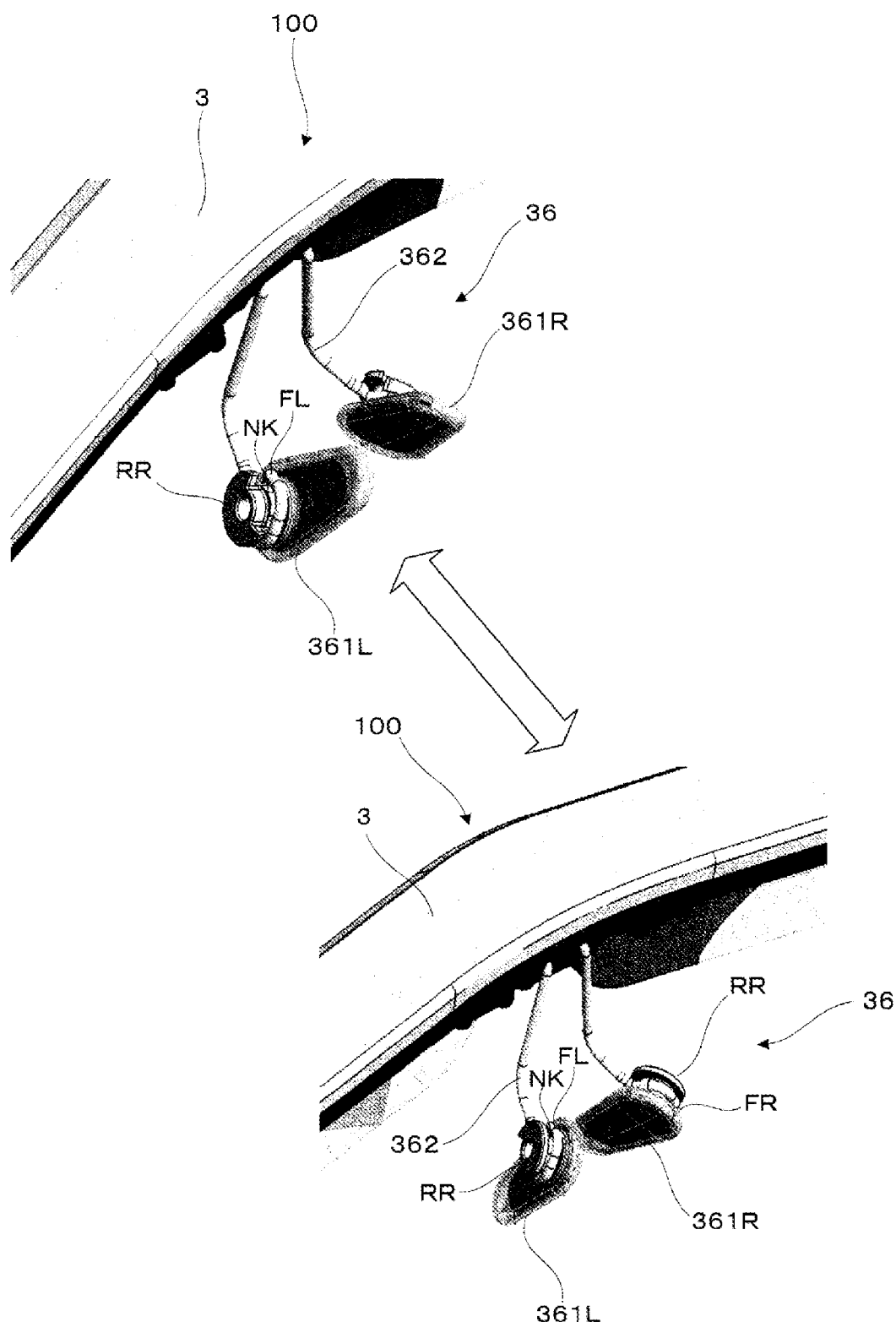
FIG. 12 is a perspective view for explaining a change of posture of the nose pad for the virtual-image display device.

Here, as an example, the narrowed portion NK is set to be slightly smaller relative to the rectangular hole HL formed by the frame-shaped portion FL of the nose pad arm 362, and the flange portion RR is set to be slightly larger relative to the hole HL, as illustrated in FIG. 10A and 10B. In other words, the narrowed portion NK is smaller than the hole HL, whereas the flange portion RR is larger than the hole HL. Thus, if the pad-side protruding portion TT is attached to the frame-shaped portion FL with the orientation thereof being changed as illustrated in FIG. 12, which is given as an example, the pad 361L can be deformed such that the posture thereof is fixed at plural certain positions where the frame-shaped portion FL and the narrowed portion NK, each of which has a rectangular shape, are fitted together.

Figure 13A:
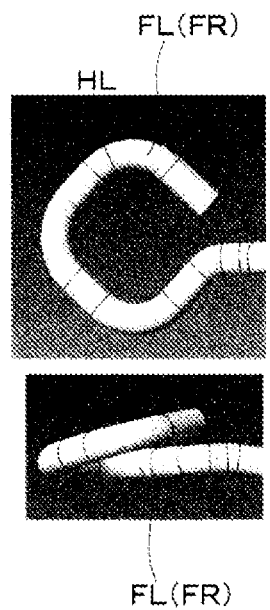
FIG. 13A illustrates an elevation view and a side view each illustrating a frame-shaped portion.

Furthermore, the hole HL of the frame-shaped portion FL of the nose pad arm 362 is formed such that the hole HL is formed by spirally winding at angles rather than winding in a flat plane as can be clearly understood when viewed from the side direction, and has a structure in which the pad 361L is inserted in a manner such that it is rotated in a screwing manner, as illustrated in FIG. 13A, which is given as an example. In the case of this exemplary embodiment, as the pad 361L is inserted while being rotated, no space remains between the frame-shaped portion FL and the narrowed portion NK after the pad is rotated by one turn, and the posture of the pad 361L is maintained there. Note that the frame-shaped portion FR on the right side also has a similar configuration.

In the case described above, the frame-shaped portion FL has a non-circular shape with respect to the center of rotation of the pad 361L, and hence, it can be said that this portion functions as a rotation restricting portion that allows the pad 61L to rotate while restricting the rotation of the rotation restricting portion itself.

As described above, in this exemplary embodiment, it is possible to allow the pad to rotate to change the posture thereof while restricting the rotation at a certain position.

Figure 13B:
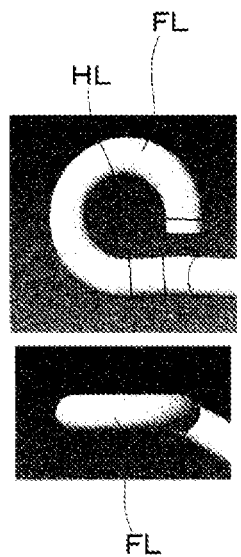
FIG. 13B is an elevation view and a side view each illustrating a frame-shaped portion according to a comparative example.

On the other hand, in the case where a flat, circular hole HL, which has no angle at the frame-shaped portion FL, is formed, for example, as in the case of the comparative example illustrated in FIG. 13B, which is similar to that illustrated in FIG. 5, rotation is made only in a concentric manner. Thus, unlike the present application, this case does not necessarily achieve the operation in which the pad is allowed to rotate to change its posture while restricting the rotation at a certain position.

As described above, in the case of this exemplary embodiment, the rotation adjustment mechanism SA is configured to allow the pad 261L, 261R, which is brought into contact with the nose of the viewer, to axially rotate to change its posture while restricting the axial rotation at a predetermined position. This configuration enables the nose pad 36 to be positioned in place, in other words, enables the visual recognition position in the head mounted display, which serves as the virtual-image display device, to be adjusted in an easy and rapid manner by a method of rotating the pad 361L, 361R and retaining it at an appropriate position, thereby meeting various requirements made by unspecified individuals such as making adjustment according to the shape of their own nose.

Others

The invention is not limited to the exemplary embodiments as described above, and can be implemented in various aspects, provided that the aspects fall within the scope of the disclosure.

First, of the exemplary embodiments described above, First and Second Exemplary Embodiments include the ratchet structure portion to provide the rotation adjustment mechanism. However, Third Exemplary Embodiment or other exemplary embodiments may provide the rotation adjustment mechanism through various aspects.

In addition, this applies to the rotation restricting portion. Furthermore, the rectangular shape has been described as an example of the non-circular shape that the rotation adjustment mechanism or the rotation restricting portion has. However, the non-circular shape is not limited to this, and it may be possible to employ various non-circular shapes such as a triangle shape and a hexagonal shape.

In addition to rotation by 360°, the pad may rotate, for example, by 180°. For example, in the case of rotation by 360° or greater, the left and right pads may be formed as the same part.

In addition, the head mounted display having the link mechanism at the temple has been described as an example of the head mounted display serving as the virtual-image display device. However, it may be possible to apply the nose pad as described above to a head mounted display that does not have any link mechanism.

Figure 14:
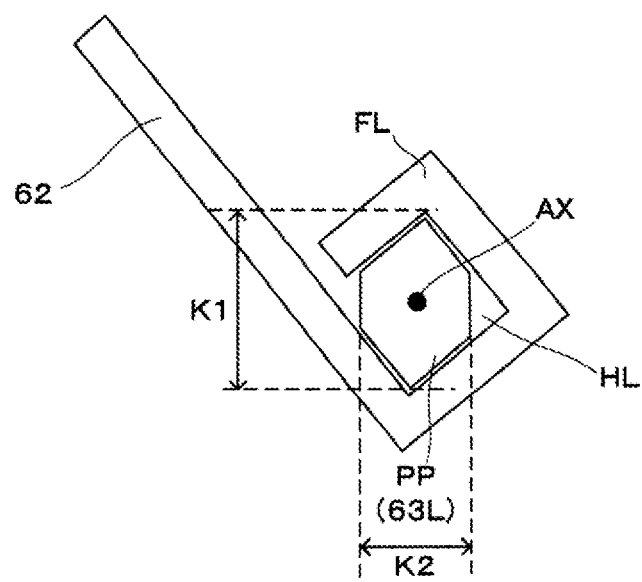
FIG. 14 is a schematic view illustrating one modification example of an attachment-portion-side protruding portion.

In addition, in the description above, for example, as for the attachment portion 63L, by adjusting the degree of fitting between the frame-shaped portion FL and the attachment-portion-side protruding portion PP having the same rectangular shape, it is possible to allow the pad 61L to maintain the state where there is a looseness to some degree with the frame-shaped portion FL of the nose pad arm 62, to make the pad fitted according to the exact shape of the nose of the viewer. However, the shape is not limited to the same rectangular shape, and the shape of the attachment-portion-side protruding portion PP may be changed into a shape, for example, as illustrated in FIG. 14. In other words, with respect to a direction perpendicular to the axis AX serving as the center of rotation, the diameter K1 on one side passing through the axis AX is shaped so as to be longer than the diameter K2 on the other side extending in a direction perpendicular to the diameter K1, to allow the rotation with the direction of the diameter K1 being the axial direction, thereby providing a looseness.

The entire disclosure of Japanese Patent Application No. 2018-011318, filed Jan. 26, 2018 is expressly incorporated by reference herein.

What is claimed is:

1. A virtual-image display device, comprising:
a pad configured to be brought into contact with a nose of a viewer;
a supporting portion configured to support the pad; and
a rotation adjustment mechanism configured to allow the pad to axially rotate to change a posture with respect to the supporting portion while restricting the axial rotation at a predetermined position.

2. The virtual-image display device according to claim 1, wherein
the rotation adjustment mechanism includes a rotation restricting portion having a non-circular shape with respect to a center of rotation.

3. The virtual-image display device according to claim 2, wherein
the rotation restricting portion has a rectangular shape.

4. The virtual-image display device according to claim 1, wherein
the rotation adjustment mechanism includes a pad-side protruding portion that extends from the pad, and a frame-shaped portion that extends from the supporting portion so as to correspond to the pad-side protruding portion.

5. The virtual-image display device according to claim 4, wherein
the frame-shaped portion has a non-circular shape with respect to a center of rotation by the rotation adjustment mechanism.

6. The virtual-image display device according to claim 4, wherein
the rotation adjustment mechanism includes an attachment portion configured to attach the pad-side protruding portion and the frame-shaped portion together.

7. The virtual-image display device according to claim 6, wherein
in the rotation adjustment mechanism, the pad-side protruding portion and the attachment portion form a ratchet structure portion.

8. The virtual-image display device according to claim 7, wherein
in the ratchet structure portion of the rotation adjustment mechanism, the pad-side protruding portion includes a gear mechanism and the attachment portion includes a hook mechanism that corresponds to the gear mechanism.

9. The virtual-image display device according to claim 6, wherein
the attachment portion includes an attachment-portion-side protruding portion that has a side-surface shape corresponding to the frame-shaped portion and is inserted into the frame-shaped portion to sandwich the frame-shaped portion cooperating with the pad-side protruding portion.

10. The virtual-image display device according to claim 1, wherein
the pad includes a contacting surface that has a non-concentric circle shape with respect to a center of rotation by the rotation adjustment mechanism.

11. The virtual-image display device according to claim 1, wherein
the rotation adjustment mechanism is configured to maintain a state where the pad is loosely fitted, while restricting rotation.

12. A nose pad for a virtual-image display device, comprising:
a pad configured to be brought into contact with a nose of a viewer;
a supporting portion configured to support the pad; and
a rotation adjustment mechanism configured to allow the pad to axially rotate to change a posture with respect to the supporting portion while restricting the axial rotation at a predetermined position.

* * * * *